US007473472B2

(12) United States Patent
Chenaux et al.

(10) Patent No.: US 7,473,472 B2
(45) Date of Patent: Jan. 6, 2009

(54) ADHESIVE COMPOSITION FOR THE DIRECT JOINING OF A PRE-GELLED POLYESTER OR VINYL ESTER TO RAW RUBBER

(75) Inventors: Philippe Chenaux, Corpataux (CH); Antonio Delfino, Grolley (CH)

(73) Assignee: Conception et Developpment Michelin S.A., Givisiez (CH)

( * ) Notice: Subject to any disclaimer, the term of this patent is extended or adjusted under 35 U.S.C. 154(b) by 0 days.

(21) Appl. No.: 11/167,988

(22) Filed: Jun. 27, 2005

(65) Prior Publication Data

US 2006/0047050 A1 Mar. 2, 2006

Related U.S. Application Data

(63) Continuation of application No. PCT/EP03/14784, filed on Dec. 22, 2003.

(30) Foreign Application Priority Data

Dec. 27, 2002 (FR) .................................. 02 16945

(51) Int. Cl.
*B32B 25/08* (2006.01)
*B32B 27/08* (2006.01)
*B32B 27/30* (2006.01)
*B32B 27/36* (2006.01)
*B32B 7/12* (2006.01)

(52) U.S. Cl. ........................ 428/480; 428/483; 428/500; 428/515; 428/519; 428/521; 525/165; 525/175; 525/203; 525/22; 525/231; 525/241

(58) Field of Classification Search ........................ None
See application file for complete search history.

(56) References Cited

U.S. PATENT DOCUMENTS 2,898,259 A 8/1959 Wheelock

| 3,616,164 | A | * | 10/1971 | Tanimoto et al. | 442/358 |
|---|---|---|---|---|---|
| 3,857,730 | A | * | 12/1974 | Kalafus et al. | 156/331.5 |
| 3,876,457 | A | * | 4/1975 | Adams | 442/126 |
| 3,903,332 | A | * | 9/1975 | Kelly et al. | 427/208.4 |
| 3,949,141 | A | * | 4/1976 | Marzocchi et al. | 428/378 |
| 4,254,016 | A | * | 3/1981 | Onizawa | 524/239 |
| 4,378,453 | A | * | 3/1983 | Yotsumoto et al. | 525/442 |
| 4,657,285 | A | * | 4/1987 | Akiyama et al. | 285/256 |
| 5,286,783 | A | * | 2/1994 | Hisaki et al. | 524/510 |
| 5,626,953 | A | * | 5/1997 | Fujimoto et al. | 428/296.4 |
| 5,863,987 | A | * | 1/1999 | Nakamura et al. | 525/92 D |
| 6,329,475 | B1 | | 12/2001 | Kelly | |
| 6,641,905 | B1 | * | 11/2003 | Fujimoto et al. | 428/297.4 |
| 7,045,201 | B2 | * | 5/2006 | Corvasce et al. | 428/296.4 |
| 2003/0213541 | A1 | | 11/2003 | Laurent et al. | |

FOREIGN PATENT DOCUMENTS

| EP | 0 322 044 A | 6/1989 |
|---|---|---|
| EP | 1 074 369 A | 2/2001 |
| GB | 1 082 493 A | 9/1967 |
| JP | 63-179927 | * 7/1988 |
| WO | WO 84/00170 A | 1/1984 |
| WO | WO 00/37269 | 6/2000 |

* cited by examiner

*Primary Examiner*—Vivian Chen
(74) *Attorney, Agent, or Firm*—Cohen Pontani Lieberman & Pavane LLP

(57) ABSTRACT

A sulfur-crosslinkable adhesive composition of the non-aqueous type, that is to say not requiring the presence of water, usable for direct bonding of a pregelled polyester or vinyl ester composite to rubber in the uncured state. The composition comprises polyvinylpyridine-styrene-butadiene elastomer ("p-VSBR") in combination with a polyester or vinyl ester resin. Preferably, the resin used is a novolak and/or bisphenol based resin of the epoxy vinyl ester type. This composition, unlike conventional RFL adhesives, does not require any activation treatment, such as intermediate drying, at the time of use. A process for preparing such an adhesive composition, use of said composition for the manufacture of laminated composite parts.

23 Claims, No Drawings

ADHESIVE COMPOSITION FOR THE DIRECT JOINING OF A PRE-GELLED POLYESTER OR VINYL ESTER TO RAW RUBBER

RELATED APPLICATIONS

This is a continuation of International Application No. PCT/EP2003/014784, filed on Dec. 22, 2003, which claims priority from French Patent Application No. 02/16945, filed on Dec. 27, 2002, the content of which is hereby incorporated by reference.

FIELD OF THE INVENTION

The present invention relates to adhesive compositions or "glues" usable for bonding rubber to composite materials, in particular for bonding diene elastomers to polyester or vinyl ester resin based composites. The invention also relates to the manufacture of composite articles which have been firmly connected with rubber.

BACKGROUND OF THE INVENTION

Patent application WO00/37269 describes a flexible, non-pneumatic tyre in which the load is borne by laminated parts comprising a stack of composite layers essentially consisting of fibres embedded in a resin with interposed layers of rubber, the overall assembly making it possible to obtain a very strong structure capable of withstanding major deformation without suffering damage. In the present application, the term "composite" is reserved to elements based on fibres and a matrix in which said fibres are embedded; on the basis of this definition, the interleaved rubber layers present in said laminated parts are not part of the composite.

Furthermore, if it is desired to provide said elastic tyre, like any other industrial product, with the best opportunities for commercial success, it is also essential to be able to produce said industrial product by a robust, non-deviating process, i.e. a process with which the properties of the resultant product may readily be controlled. Furthermore, for parts which are to be produced in very large numbers, it is most desirable for the process to be suitable for elevated manufacturing rates.

Application EP-A-1 074 369 has proposed a process for manufacturing composite parts, one of the secondary objects of said process being to make it possible to combine the composite part with rubber in order to produce a laminated element suitable for use in resilient solid tyre. The present application describes a process comprising a prepolymerisation phase: fibres are embedded in a matrix based on a composition comprising a thermosetting resin, the composition containing said fibres is exposed to ionising radiation in order partially to polymerise the resin and obtain a precomposite (also designated "pregelled" composite) in which said composition is in the solid phase. The desired result is to obtain a finished part without appreciable degradation of the maximum possible reinforcing action depending on the fibres selected, it being possible for the part to have very different shapes, in particular very small radii of curvature. The load-bearing parts described in application WO00/37269 may be manufactured in accordance with the process described in said application EP-A-1 074 369.

With regard to bonding to rubber, said application EP-A-1 074 369 mentions the use of a well-known adhesive of the resorcinol-formaldehyde latex type (known as "RFL"), which is dried before receiving said rubber layer in the uncured state. In this manner, a certain degree of connection is obtained between the precomposite and the rubber. Then, the final moulding step of the laminated part, with heat treatment under pressure, makes it possible not only to crosslink or cure the rubber, but also to achieve complete polymerisation of the resin and an excellent connection between the composite and the rubber.

Unfortunately, however, the use of an unpolymerised RFL adhesive, while making it possible to dispense with using special elastomers to stick the rubber to the composite material and enabling the production of a mechanically effective bond, does entail an additional, intermediate drying step of said RFL adhesive prior to contact with the rubber, which is somewhat inimical to achieving elevated production rates.

SUMMARY OF THE INVENTION

One object of the invention is to provide bonding which is both mechanically effective and lends itself to highly efficient industrial processing.

In the course of its research, the Applicant has now found a solution to the above problem, moreover without any degradation in adhesion performance. Very significant gains in production times are achieved and there is moreover no solvent (water or other solvent) to be eliminated during the bonding operation, a factor which is itself a further advantage.

Consequently, one aspect of the invention concerns a sulfur-crosslinkable adhesive composition which may be used for direct bonding of a polyester or vinyl ester precomposite to uncured rubber, said composition being characterised in that it comprises a polyvinylpyridine-styrene-butadiene elastomer (abbreviated to "p-VSBR") and a polyester or vinyl ester resin.

Another aspect of the invention concerns a process for the production of such a composition, said process comprising the following steps:

a) starting from a p-VSBR elastomer latex;
b) extracting the water from the latex;
c) incorporating into the elastomer a polyester or vinyl ester resin in solution in styrene.

This composition does not require any intermediate drying step and so enables direct bonding of an unvulcanised diene elastomer (i.e. in the uncured state) onto a polyester or vinyl ester precomposite without an activating treatment at the time of its use.

Yet another aspect of the invention concerns the use of an adhesive composition according to the invention for bonding a polyester or vinyl ester composite to a diene elastomer.

Another aspect of the present invention concerns per se a process for the production of laminated parts comprising at least one composite comprising reinforcement fibres embedded in a matrix based on a composition comprising a curable resin and at least one rubber firmly connected to said composite, said process comprising the following steps:

providing a precomposite comprising reinforcement fibres embedded in the resin, the latter being prepolymerised;

coating said precomposite with a layer of a ready-to-use adhesive composition;

coating said composition with a layer of sulfur-vulcanisable rubber;

subjecting the stack comprising the precomposite, the adhesive composition and the rubber to final moulding under a pressure and at a temperature appropriate for continuing the polymerisation of the resin, the vulcanisation of the elastomer, the crosslinking of the adhesive composition with the rubber and the polymerisation of the adhesive composition with the resin.

Another aspect of the present invention extends to any laminated part comprising at least one layer of polyester or vinyl ester composite connected to a layer of rubber, the connection between the two layers being provided by an adhesive interphase comprising an adhesive composition based on p-VSBR elastomer and polyester or vinyl ester resin.

DETAILED DESCRIPTION OF EMBODIMENTS OF THE INVENTION

In the present description, unless explicitly stated otherwise, all the percentages (%) stated are weight percentages.

I.1—Adhesive Composition

The adhesive of the invention has the essential feature of being based on a p-VSBR elastomer associated with a polyester or vinyl ester resin.

Vinyl ester resins are well known in the field of composite materials; without this definition constituting a limitation, the vinyl ester resin is preferably of the epoxy vinyl ester type. Furthermore, "polyester resin" is, in known manner, taken to mean a resin of the unsaturated polyester type.

The person skilled in the art will be capable of adjusting the formulation of the adhesive of the invention in the light of the description and the examples of embodiment which follow.

In order to ensure optimum effectiveness of this adhesive compared with a conventional RFL adhesive, in particular in the manufacture of composite parts according to the invention, it is preferred that the content of p-VSBR be between 10% and 40% and that the content of the polyester or vinyl ester resin be between 40% and 80% (% by weight of the composition in the "dry" state, that is to say without any solvent (the solvent of the resin itself being excluded) or water).

More preferably, the content of p-VSBR is between 15% and 30%, in particular between 15% and 25%, and the content of polyester or vinyl ester resin is between 50% and 75%, in particular between 60% and 75%.

This adhesive composition, which is sulfur-crosslinkable thanks to the presence of the p-VSBR elastomer, is capable of directly bonding a polyester or vinyl ester precomposite to a diene elastomer (or rubber) in the uncured state.

As described in the above-mentioned application EP-A-1 074 369, a "precomposite" is more specifically intended to mean a composite whose resin is prepolymerised (or "pregelled") until it forms a solid medium ("gel" stage or beyond), so that the precomposite has sufficient cohesion to be handled, for example so that it can be placed in an open mould with the mechanical stresses associated therewith without running the risk of "wringing" the fibres, which is associated with an uncontrolled reduction in the resin content of the preform. Use of the phrase "open mould" does not, of course, rule out the possibility that the mould is subsequently closed during a manufacturing step of the final composite; all that is intended is that the person skilled in the art be provided with an indication of the level of mechanical properties to be achieved. The mechanical properties to be achieved must be just sufficient for it to be possible for the precomposite to be handled, but at the same time to be as weak as possible such that the precomposite lends itself readily to any deformation and shaping and it is desirable for such deformation and shaping only to be accompanied by the lowest possible, i.e. negligible, level of internal stresses.

The aim of prepolymerisation is thus preferably to achieve a minimum level of polymerisation allowing the prevention of any outflow of resin upon subsequent treatment thereof (in effect, treatment of the composite or of the item into which it is incorporated) under the action of heat, or even of pressure.

The aim of prepolymerisation is also to achieve a minimum level of polymerisation such as to impart to the precomposite resistance to fibre buckling under bending stress, such as that imposed by application onto a non-planar support, while, as already stated, avoiding the introduction of any prestress during bending. The prepolymerisation as proposed, combined with processing of the material by lamination in sufficiently thin layers, makes it possible to replicate a block of any shape and thickness, relative to a monolithic material produced with the same resin and the same fibres of identical density, for example produced by pultrusion.

These definitions of a mechanical nature having been given, a polyester or vinyl ester "precomposite", or "pregelled" polyester or vinyl ester composite, is also taken to mean a composite whose polyester or vinyl ester resin matrix, by virtue of its prepolymerised state, has a glass transition temperature Tg (measured according to ASTM Standard D3418-82) of preferably between 40 and 130° C. or a Shore D hardness (measured according to ASTM Standard D2240-86) of preferably between 50 and 65.

The p-VSBR elastomer consists in known manner of a polyvinylpyridine coupled to an SBR (styrene-butadiene rubber) diene elastomer; it is of the general formula:

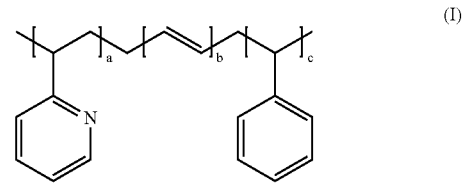

(I)

It is a polymer having a very high molecular mass, preferably of 500,000 to 1,000,000 g/mol. It is generally commercially available in the form of a latex (emulsion in a dilute aqueous basic phase), for example having a polymer content approaching 40% by weight.

Polyester or vinyl ester resins are well known to the person skilled in the art; they have been described in numerous publications, in particular in the above-mentioned application EP-A-1 074 369, or alternatively, by way of example, in documents U.S. Pat. No. 6,329,475 or WO 84/00170 which describe this type of compound in detail.

A vinyl ester resin is preferably used, in particular of the epoxy type, which is at least in part based on (that is to say grafted onto) a novolak type structure (also known as a phenoplast) and/or a bisphenol type structure (i.e. based on novolak, on bisphenol or on novolak and bisphenol).

A novolak-based epoxy vinyl ester resin (portion between square brackets) is in known manner, for example, of the formula:

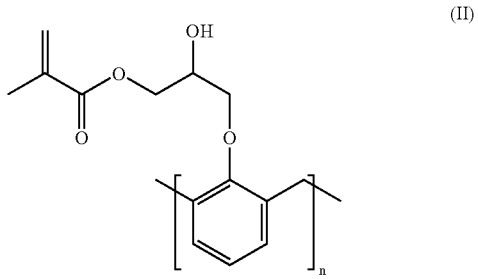

(II)

A A-bisphenol (portion between square brackets of formula III below) based epoxy vinyl ester resin is, for example, of the formula (the "A" indicating that the product is produced with the assistance of acetone):

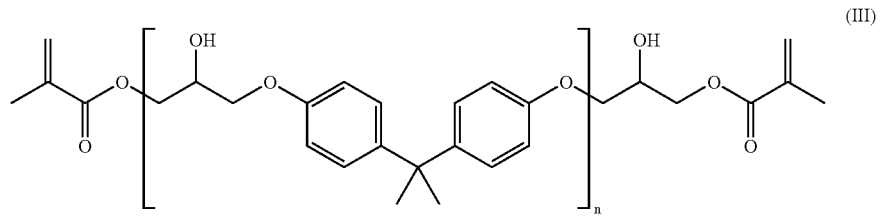

A novolak and bisphenol type epoxy vinyl ester resin exhibited excellent results, which were in particular improved relative to a bisphenol resin alone, due to a better uncured adhesive power and thus easier processing. By way of example of such a resin, mention may in particular be made of the vinyl ester resin "ATLAC 590" from DSM (diluted with approximately 40% styrene) described in the above-mentioned application EP-A-1 074 369. Such epoxy vinyl ester resins are available from other manufacturers such as Dow, Reichhold, Cray Valley, UCB.

The adhesive composition of the invention exhibits an elevated viscosity, which may make industrial processing thereof relatively difficult. This is why the viscosity thereof is preferably reduced by adding a resin solvent in a content of between 0% and 40% (% by weight of the final, i.e. ready-to-use, adhesive). This resin solvent is preferably styrene.

More preferably, the amount of solvent is adjusted between 5% and 35%, in order to impart adequate flow to the composition of the invention; at a content of below 5%, said flow may prove insufficient depending on the intended industrial application; at a content of above 35% or 40%, there is a risk of excessively high flow and it may become difficult to process the composition in layers which remain homogeneous after application of the layers of material to be bonded (risk of occurrence of disruptive "wringing" phenomena). Optimum application of adhesive during production of the previously described laminated elements may be achieved by using a solvent content of preferably between 10% and 30% and more preferably still of between 10% and 20%.

Unlike p-VSBR based adhesives known to the person skilled in the art, the adhesive of the invention does not require the presence of water.

It is in this respect that it may be described as "non-aqueous" or of the non-aqueous type, although it is capable of withstanding the presence of small quantities of water without suffering damage. For the purposes of the present application, "non-aqueous" is taken to mean a composition preferably comprising less than 5% by weight of water (% by weight of the final, ready-to-use composition); at contents of greater than 5%, it has been observed that, while the bond itself is unaffected, the final composition contained or could contain solid particles (lumps) which hamper processing and application of the adhesive with industrial tools. For this reason, it is preferred that the "non-aqueous" composition of the invention contain less than 2%, more preferably still less than 1% by weight of water.

In order to achieve curing times which are compatible with those of the rubber, the adhesive compositions of the invention advantageously comprise known polymerisation accelerators and activators for the resin itself, such as cobalt(II) salts (for example cobalt 2-ethylhexanoate), dimethylaniline (DMA) or diethylaniline (DEA), N, N-dimethylacetoacetamide (DMM) or N,N-diethylacetoacetamide (DEAA), typically in a content of between 0.3 and 3.0 phr.

The adhesive compositions of the invention also comprise all or some of the additives usually used in adhesives intended for bonding rubber to composite materials, such as reinforcing fillers such as carbon black or silica, anti-ageing agents, for example antioxidants, plasticisers, coupling agents, a crosslinking system based either on sulfur, or on sulfur donors and/or peroxide, vulcanisation accelerators, activators or retarders, methylene acceptors and donors (such as HMT or H3M), reinforcing resins such as resorcinol, bismaleimide, tackifying resins.

The crosslinking (vulcanisation) system proper is preferably based on sulfur and a primary vulcanisation accelerator, in particular an accelerator of the sulfenamide type. This basic vulcanisation system is complemented, if required, by various known secondary accelerators or vulcanisation activators, such as zinc oxide, stearic acid etc . . . Sulfur is used in a preferred amount of between 0.5 and 10 phr, more preferably of between 0.5 and 5.0 phr. The primary vulcanisation accelerator is used in a preferred amount of between 0.5 and 10 phr, more preferably of between 0.5 and 5.0 phr.

I.2—Preparation of the Adhesive Composition

The above-described adhesive composition may be prepared by a process which is also provided by the invention; said process comprises the following steps:
  a) starting from a p-VSBR elastomer latex;
  b) extracting the water from the latex;
  c) incorporating into the elastomer a polyester or vinyl ester resin in solution in styrene.

Step b) of extracting water from the latex may be performed by any means known to the person skilled in the art, in particular by the action of a coagulant such as a salt, a base or an acid, for example by coagulation in an acetone-water mixture in an acidic medium (e.g. HCl) then neutralisation (with water or by the action of a weak base), followed by a filtrate recovery and drying step (evaporation of the solvent).

The water may also be extracted from the latex by azeotropic distillation, in which case the elastomer is dissolved in an organic solvent such as toluene and a step d) may be added after step c) above in order to carry out an at least partial extraction of the organic solvent(s) used.

According to such a variant embodiment, the process of the invention then comprises the following steps:
  a) starting from a p-VSBR elastomer latex;
  b) extracting the water from the latex by azeotropic distillation and dissolving the elastomer in an organic solvent, preferably toluene;
  c) incorporating into the dissolved elastomer a polyester or vinyl ester resin in solution in styrene.
  d) carrying out an at least partial extraction of the organic solvents.

It will be recalled that, by definition, an azeotropic distillation involves the distillation of a mixture of two liquids whose liquid and vapour phases are in thermodynamic equilibrium under a given pressure. This is characterised by a constant boiling temperature. The mixture accordingly behaves in the same manner as a pure substance. It permits solvent exchange, that is to say in the present case extraction of the water from the latex and dissolution of the p-VSBR elastomer in the selected organic solvent.

On completion of step b), when said step is performed by azeotropic distillation, the content of p-VSBR elastomer in the organic solvent is preferably between 0.5% and 5% of p-VSBR elastomer with a solvent content of between 95% and 99.5%, more preferably of between 1% and 3% of p-VSBR elastomer (with a solvent content of between 97% and 99%). If the concentration of elastomer is higher, there is a risk of excessively rapid gelation of the adhesive, while an excessively low concentration is not advantageous from an economic standpoint. The recommended organic solvent for this step b) is toluene.

During step c), the (resin:p-VSBR elastomer) weight ratio is preferably selected between 1 and 8. More preferably it is between 1.5 and 7.0, for example between 2.0 and 6.0. A value within a range from 3 to 5, for example approaching or equal to 4, has proved optimal in a very large number of instances.

It is preferably during this step c) that all the additives for the adhesive composition, in particular the crosslinking system thereof, are added. These additives preferably themselves assume the form of a solution or suspension (the latter being the case for example for carbon black and and ZnO, which are insoluble) in an appropriate organic liquid, preferably the same as that used, if applicable, for the preceding step b).

With regard to the residual content of organic solvent (in particular styrene) at the end of step d), the reader is referred to the considerations relating to processing of the composition, it being noted that the solvent is neutral in terms of actual adhesive performance. The primary purpose of this organic solvent extraction step is to result in the particular flow characteristics intended for the application under consideration. Said extraction, performed for example by straightforward vacuum extraction, may be continued down to a residual styrene content (% by weight of the final composition) of preferably between 0% and 40%, more preferably of between 5% and 35%.

A residual styrene content of between 10% and 30%, more particularly of between 10% and 20%, has for example proved advantageous for the production of the above-described laminated parts of the invention.

On the other hand and preferably, the following characteristics should prevail in the final adhesive composition:

residual toluene content of between 0% and 5%, more preferably of less than 2%, more preferably still of less than 1%;

overall content of toluene and styrene of between 5% and 40%, more preferably of between 10% and 30% (in particular between 10% and 20%).

I.3—Use of the Adhesive Composition for the Manufacture of Laminated Parts

The invention also concerns the use of an adhesive composition according to the invention for direct bonding of a polyester or vinyl ester precomposite to an unvulcanised diene elastomer (in the uncured state).

The invention also concerns per se laminated parts or elements (also known as "laminates"), both before and after curing, comprising at least one composite comprising reinforcement fibres embedded in a matrix based on polyester or vinyl ester resin and at least one rubber firmly connected to said composite, these laminated parts being characterised in that the composite and the rubber are assembled and firmly connected together thanks to the adhesive composition of the invention.

These laminated parts in particular take the form of layers of vinyl ester composites and layers of diene rubber which have been stacked, such as, for example, described in the above-stated patent application EP-A-1 074 369.

A)—Polyester or Vinyl Ester Precomposite Layers

With regard to the preparation of the precomposite, the reader is referred, purely by way of non-limiting illustration, to patent applications EP-A-1 074 369 and EP-A-1 174 250. Layers of precomposite of a given thickness are prepared by laying out reinforcement fibres substantially parallel to a plane and impregnating them with a composition comprising a UV radiation-curable polyester or vinyl ester resin, then irradiating the composition containing said fibres, which are present in a layer of a thickness less than said given thickness, to polymerise partially the resin used and so obtain a precomposite in which said composition is in the solid phase.

B)—Rubber Layers

The rubber layers are formed in known manner from elastomer compositions based on at least one (one or more) diene elastomer.

"Diene" elastomer or rubber is understood to mean, in known manner, an elastomer arising at least in part (i.e. a homopolymer or a copolymer) from diene monomers, that is to say monomers bearing two carbon-carbon double bonds, whether conjugated or not. An "essentially unsaturated" diene elastomer is understood here to mean a diene elastomer resulting at least in part from conjugated diene monomers, having a content of dienic members or units (conjugated dienes) which is greater than 15% (mol %). Thus, for example, diene elastomers such as butyl rubbers or copolymers of dienes and of alpha-olefins of the EPDM type do not fall within the preceding definition, and may in particular be described as "essentially saturated" diene elastomers (low or very low content of dienic structural units which is always less than 15%). Within the category of "essentially unsaturated" diene elastomers, a "highly unsaturated" diene elastomer is understood to mean in particular a diene elastomer having a content of dienic structural units (conjugated dienes) which is greater than 50%.

These definitions having been given, the diene elastomer used is preferably selected from the group of highly unsaturated diene elastomers consisting of polybutadienes (BR), natural rubber (NR), synthetic polyisoprenes (IR), butadiene-styrene copolymers (SBR), isoprene-butadiene copolymers (BIR), isoprene-styrene copolymers (SIR), butadiene-styrene-isoprene copolymers (SBIR) and mixtures of these elastomers.

A preferred embodiment consists in using an "isoprene elastomer", that is to say an isoprene homopolymer or copolymer, in other words a diene elastomer selected from the group consisting of natural rubber (NR), synthetic polyisoprenes (IR), the various copolymers of isoprene and mixtures of these elastomers. Of the isoprene copolymers, mention will be made in particular of isoprene-styrene copolymers (SIR), isoprene-butadiene copolymers (BIR) or isoprene-butadiene-styrene copolymers (SBIR). [0059] The isoprene elastomer is preferably natural rubber or a synthetic polyisoprene of the cis-1,4 type. Of these synthetic polyisoprenes, those polyisoprenes having a content (mol %) of cis-1,4 bonds greater than 90%, more preferably still of greater than 98%, are preferably used.

According to other preferred embodiments, the diene elastomer may consist, entirely or in part, of another highly unsaturated elastomer such as, for example, an SBR elastomer used in a blend or not with another elastomer, for example of the BR type.

The rubber compositions of the laminated elements also comprise all or some of the additives usually used in the rubber matrices intended for the manufacture of tyres, such as reinforcing fillers such as carbon black or silica, anti-ageing agents, for example antioxidants, extender oils, plasticisers or agents facilitating the processing of the compositions in the uncured state, coupling agents, a crosslinking system based either on sulfur, or on sulfur donors and/or peroxide, vulcanisation accelerators, activators or retarders such as zinc oxide, stearic acid, methylene acceptors and donors such as for example HMT (hexamethylenetetramine) or H3M (hexamethoxymethylmelamine) or reinforcing resins (such as resorcinol or bismaleimide).

C)—Manufacture of Laminated Parts

The present invention also concerns per se a process for the production of laminated parts comprising at least one composite comprising reinforcement fibres embedded in a matrix based on a composition comprising a curable resin and at least one rubber firmly connected to said composite, said process comprising the following steps:

A) providing a precomposite comprising reinforcement fibres embedded in the resin, the latter being prepolymerised;

B) coating said precomposite with a layer of a ready-to-use adhesive composition;

C) coating said composition with a layer of sulfur-vulcanisable diene elastomer;

D) subjecting the stack comprising the precomposite, the adhesive composition and the rubber to final moulding under a pressure and at a temperature appropriate for continuing the polymerisation of the resin, the vulcanisation of the elastomer, the crosslinking of the adhesive composition with the elastomer and the polymerisation of the adhesive composition with the resin.

One particularly preferred embodiment of this process applies to the case of a curable polyester or (epoxy) vinyl ester type resin and consists in using, for the processing of step B), the previously described adhesive composition according to the invention, which is ready-to-use, that is to say does not require any intermediate activation treatment such as for example a drying step.

In the above manufacturing process, step C) preferably takes place at the latest immediately on completion of step B).

Finally, the present invention also extends to any laminated part, whether in the uncured state or in the cured state, comprising at least one layer of polyester or vinyl ester composite connected to a layer of rubber, the connection between the two layers being provided by an adhesive interphase comprising an adhesive composition according to the invention based on p-VSBR elastomer (preferred content by weight of between 10% and 40%) and a polyester or vinyl ester resin (preferred content by weight of between 40% and 80%).

The person skilled in the art will understand that the phrase "based on" in relation to the composition is to be understood to mean here an adhesive composition comprising the mixture and/or the in situ reaction product of the various constituents used for this adhesive, some of these base constituents (in particular p-VSBR and resin) being likely or intended to react, at least in part, among themselves or with their immediate chemical environment during the various phases of manufacture of laminated parts, in particular during the final curing step.

II. EXAMPLES OF EMBODIMENT

The aim of the following tests is to demonstrate that, despite a very significant advantage with regard to processing, the performance of an adhesive composition according to the invention remains at least identical to, if not superior to, that of a conventional RFL adhesive.

II-1 Preparation of the Adhesive Composition According to the Invention

A) Example 1

The particular process stated below was used as a first example of preparation of the adhesive according to the invention:

a) starting from a p-VSBR elastomer latex;

b) extracting the water from the latex by azeotropic distillation and dissolving the elastomer in an organic solvent (in the present case toluene);

c) incorporating into the elastomer dissolved in this manner a vinyl ester resin in solution in styrene, in a preferred (resin:elastomer) weight ratio of between 1 and 8 (in the present case of 4);

d) carrying out an at least partial extraction of the organic solvents (toluene and styrene).

More specifically, the following method is used:

750 ml of toluene are refluxed at a temperature of between 110° C. and 112° C. in a 1.5 litre round-bottomed sulfuration flask. 50 g of p-VSBR latex ("Pyratex 240" from Polymer-Latex) in the form of a polymer-in-water emulsion (40% polymer, i.e. 20 g of p-VSBR, with 60% water and basic stabilisers at pH 10-12) are then added dropwise.

The water/toluene mixture is distilled at a temperature of 100° C., while gradually reintroducing into the round-bottomed flask the same quantity of toluene as that which has been extracted (approx. 500 ml). In this manner, distillation lasts approximately 5 hours until the elastomer has dissolved completely in the toluene and a homogeneous, highly limpid first solution has been obtained.

A second organic solution is prepared, comprising vulcanisation agents, carbon black and various constituents dissolved (or dispersed) in toluene (230 ml), the formulation of said solution being adapted to the bonding of the intended rubber layer (described in paragraph II-2 below). The formulation of this second solution is stated in Table 1 (the quantities in phr are parts by weight per 100 parts of p-VSBR elastomer).

The above two solutions are then mixed, at ambient temperature, with 125 g of "ATLAC 590" solution taking the form of a mixture of resins of the above-stated formulae (II) and (III) (64% epoxy vinyl ester resin, i.e. 80 g of dry vinyl ester, with 36% styrene solvent).

Once the mixture is homogeneous, the toluene and styrene are evaporated under a vacuum down to a solvent content of approximately 15% (almost exclusively styrene). In this manner, a high viscosity adhesive suitable for the intended application is obtained.

It should be noted that a simple variant of the above-described example of embodiment consists in incorporating all the ingredients of the second solution (vulcanisation agents, carbon black, etc.) directly into the first solution without separately preparing such a second solution.

B) Example 2

The particular process stated below was used as a second example of preparation of the adhesive according to the invention:
a) starting from a p-VSBR elastomer latex;
b) extracting the water from the latex by coagulation;
c) incorporating into the elastomer a polyester or vinyl ester resin in solution in styrene.

More specifically, 210 ml of acetone and 415 ml of 1% HCl (pH of approx. 1 to 2) are mixed in a reactor. A mixture of 50 g of p-VSBR latex ("Pyratex 240") and 35 ml of water is added dropwise under a stream of nitrogen with stirring at ambient temperature (duration of addition approx. 45 minutes). In order to maintain the pH at a constant value of 1-2, 40 ml of HCl (10%) are simultaneously added dropwise. The latex thus coagulates in a fine and regular manner during addition. The mixture is then left to stand until the phases have completely separated, the elastomer floating at the surface.

The polymer is then separated from the aqueous phase and is washed several times with water in order to adjust the pH slowly towards 7. A final wash may, for example, be performed with a water/acetone mixture. Once the mixture has been left to settle, the polymer may be processed in an apparatus which allows the polymer to be broken down into very fine particles. Finally, the polymer is filtered and dried for 12 hours under a vacuum at a temperature of 60° C.

The 20 g of p-VSBR obtained in this manner are added to 125 g of vinyl ester resin ("ATLAC 590", i.e. 80 g of dry vinyl ester) and left to stand overnight. The polymer swells, absorbing the resin. The remainder of the components (carbon black, vulcanisation agents, etc.) are then added directly in an external mixer (roll mill) at ambient temperature and the materials are mixed until a homogeneous adhesive is obtained.

In order not only to increase the viscosity of the adhesive but also to reduce the quantity of solvent released during curing of the composite in the press, it is possible to dry the vinyl ester resin under a high vacuum before mixing it with the polymer, for example down to a residual styrene content of between 10% and 15%.

It should again be emphasised that, although the adhesive according to the invention comprises a certain residual quantity of solvent, it does not have the usual drawbacks of solvent-based adhesives because the styrene is completely consumed by reaction during processing of the adhesive by participating in the polymerisation; it thus does not need to be evaporated.

11-2 Preparation of Laminated Composites and Parts—Characterisation

The composites tested are mixtures of glass fibres (Owens Corning) impregnated in a vinyl ester resin, such as described in the above-stated application EP-A-1 074 369. Fibre content is 70-75%. A photoinitiator ("Irgacure 819" from Ciba) is added (2% by weight) in order to pregel (prepolymerise) the resin for 30 seconds at a distance of 17 cm under two 410 nm UV lamps, each of 40 W.

The adhesive of the invention is then applied in a layer thickness of 50 to 100 μm onto two sheets of composite pregelled in this manner. A layer of uncured (unvulcanised) rubber is then sandwiched between these two sheets of composite, each coated with their respective layer of adhesive, the formulation of said rubber corresponding to a known rubber composition based on natural rubber and carbon black, which may be used in particular as a calendering rubber of a reinforcement armature of a tyre carcass; two different formulations (stated in phr) are stated by way of example in Table 2.

The assembly is press cured, for example at 180° C. for 45 min, under a pressure of 50 bar, which enables completion of the polymerisation of the composite and the adhesive, as well as vulcanisation or curing of the rubber. These curing parameters are merely indicative and may be modified (for example curing at 165° C. for 20 minutes under a pressure of 20 bar) in particular thanks to the use of variable quantities polymerisation accelerators or activators for the vinyl ester resin.

In order to prepare a prior art laminated part (control), the same method is used as previously, with the exception that the adhesive of the invention is replaced by a conventional (unpolymerised) RFL adhesive, and that, before being placed in contact with the uncured rubber, the latter must undergo an intermediate drying treatment (temperature of below 100° C.), as indicated in the above-stated application EP-A-1 074 369.

The laminated parts prepared in this manner are then subjected to a known peel test as described in international standard ISO 8510-1:1990(F). Very high tear values (750 N load over a width of 25 mm) are observed on the part according to the invention, while a lower tear force of the order of 700 N is obtained on the control part.

On peeling, the sample according to the invention, like the control product, exhibits failure in the elastomer layer and not in the adhesive interphase, which demonstrates a very high level of adhesion in both cases.

TABLE 1

| | |
|---|---|
| Carbon black (N683) | 50 |
| Tackifying resin | 1 |
| Phenol-formaldehyde resin | 10 |
| HMT | 3.3 |
| Polymerisation accelerator (1) | 2 |
| Polymerisation activator (2) | 0.5 |
| ZnO | 3 |
| Stearic acid | 1 |
| Sulfur | 2.2 |
| Vulcanisation accelerator (3) | 0.9 |

(1) cobalt(II) 2-ethylhexanoate (accelerator "NL-51P", Akzo Nobel);
(2) N,N-diethylacetoacetamide ("Promoter C", Akzo Nobel);
(3) N-dicyclohexyl-2-benzothiazolesulfenamide ("Santocure CBS", from Flexsys).

TABLE 2

| | | |
|---|---|---|
| Natural rubber | 100 | 55 |
| SBR elastomer | — | 15 |
| BR elastomer | — | 30 |
| Carbon black (N326) | 66 | 50 |
| Antioxidant (4) | 2.2 | 1.5 |
| Extender oil | 2 | 10 |
| ZnO | 7.5 | 5.0 |
| Stearic acid | 0.6 | 0.6 |
| Sulfur | 4.5 | 3.0 |
| Vulcanisation accelerator (5) | 0.7 | 0.9 |

(4) N-(1,3-dimethylbutyl)-N'-phenyl-p-phenylenediamine; ("Santoflex 6-PPD" from Flexsys);
(5) N-dicyclohexyl-2-benzothiazolesulfenamide ("Santocure CBS", from Flexsys).

We claim:

1. A sulfur-crosslinkable non-aqueous liquid adhesive composition comprising at least a polyvinylpyridine-styrene-butadiene elastomer (abbreviated to "p-VSBR"), a polyester or vinyl ester resin, less than 2% water, and between 5% and 35% of a resin solvent, based on the weight of the adhesive composition.

2. The composition according to claim 1, wherein the content of p-VSBR is between 10% and 40% and the content of polyester or vinyl ester resin is between 40% and 80% (% by weight of the adhesive composition in the dry state).

3. The composition according to claim 2, wherein the content of p-VSBR is between 15% and 30%.

4. The composition according to claim 2, wherein the content of polyester or vinyl ester resin is between 50% and 75%.

5. The composition according to claim 1 wherein the resin solvent is styrene.

6. The composition according to claim 5, wherein the content of styrene is between 10% and 30%, based on the weight of the adhesive composition.

7. The composition according to claim 1, further comprising between 0 and 5% of toluene as solvent for the p-VSBR elastomer.

8. The composition according to claim 1, wherein the resin is a vinyl ester resin, preferably of the epoxy vinyl ester type.

9. The composition according to claim 1, the vinyl ester resin being a novolak and/or bisphenol based vinyl ester resin.

10. The composition according to claim 1, further comprising a polymerisation accelerator and activator.

11. The composition according to claim 1, further comprising a crosslinking system, preferably based on sulfur and sulfenamide accelerator.

12. The composition according to claim 1, further comprising a reinforcing filler, preferably selected from among the group consisting of carbon black and silica.

13. The method for using an adhesive composition according to claim 1, for bonding a polyester or vinyl ester composite to a diene elastomer.

14. The method according to claim 13, wherein the diene elastomer is selected from the group consisting of polybutadienes, natural rubber, synthetic polyisoprenes, butadiene-styrene copolymers, isoprene-butadiene copolymers, isoprene-styrene copolymers, butadiene-styrene-isoprene copolymers and mixtures of these elastomers.

15. The method according to claim 14, wherein the diene elastomer is selected from the group consisting of natural rubber, synthetic polyisoprenes and mixtures of these elastomers.

16. A laminated part comprising at least one layer of polyester or vinyl ester composite connected to a layer of diene elastomer, the connection between the two layers being provided by a non-aqueous liquid adhesive composition based on p-VSBR elastomer and polyester or vinyl ester resin.

17. The laminated part according to claim 16, wherein the content of p-VSBR is between 10% and 40% and the content of polyester or vinyl ester resin being between 40% and 80% (% by weight of adhesive composition in the dry state).

18. The laminated part according to claim 17, wherein the content of p-VSBR is between 15% and 30%.

19. The laminated part according to claim 17, wherein the content of polyester or vinyl ester resin is between 50% and 75%.

20. The laminated part of claim 16 wherein the adhesive composition comprises between 5% and 35% of a resin solvent, based on the weight of the adhesive composition.

21. The laminated part of claim 16 wherein the adhesive composition comprises less than 2% water based on the weight of the adhesive composition.

22. A sulfur-crosslinkable non-aqueous liquid adhesive composition comprising at least a polyvinylpyridine-styrene-butadiene elastomer and a polyester or vinyl ester resin.

23. The sulfur-crosslinkable non-aqueous liquid adhesive composition of claim 22 further comprising between 5% and 35% of a resin solvent, based on the weight of the adhesive composition.

* * * * *